US011009123B1

(12) United States Patent
Oh (10) Patent No.: US 11,009,123 B1
(45) Date of Patent: May 18, 2021

(54) METHOD AND SYSTEM OF LEARNING PRESSURE APPLIED TO COUNTERSHAFT BRAKE

(71) Applicants: Hyundai Motor Company, Seoul (KR); Kia Motors Corporation, Seoul (KR)

(72) Inventor: June Oh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/846,004

(22) Filed: Apr. 10, 2020

(30) Foreign Application Priority Data

Feb. 10, 2020 (KR) ........................ 10-2020-0015909

(51) Int. Cl.
  *F16H 61/06* (2006.01)
  *F16H 61/12* (2010.01)
  *F16H 61/04* (2006.01)
  *F16H 61/00* (2006.01)

(52) U.S. Cl.
  CPC ....... *F16H 61/061* (2013.01); *F16H 61/0403* (2013.01); *F16H 61/12* (2013.01); *F16H 2061/0087* (2013.01); *F16H 2061/0411* (2013.01); *F16H 2061/0492* (2013.01); *F16H 2061/062* (2013.01); *F16H 2061/1276* (2013.01)

(58) Field of Classification Search
  CPC .... F16H 61/061; F16H 61/12; F16H 61/0403; F16H 2061/0087; F16H 2061/1276; F16H 2061/0411; F16H 2061/0492; F16H 2061/062
  See application file for complete search history.

(56) References Cited

U.S. PATENT DOCUMENTS

| | | | |
|---|---|---|---|
| 8,271,169 B2 * | 9/2012 | Hasegawa | F16H 61/061 701/62 |
| 2004/0053745 A1 * | 3/2004 | Sakamoto | F16H 61/061 477/121 |
| 2012/0330520 A1 * | 12/2012 | Ulbricht | F16H 61/0403 701/51 |
| 2014/0081539 A1 * | 3/2014 | Gansohr | F16H 61/68 701/53 |

* cited by examiner

*Primary Examiner* — Justin Holmes
(74) *Attorney, Agent, or Firm* — Morgan, Lewis & Bockius LLP (57) ABSTRACT

A method and a system of learning a pressure applied to a brake of a countershaft may include determining, when a shift condition is satisfied, whether a shifting to be performed is a power off upshift; releasing a clutch mounted between a power source and the transmission when the shifting to be performed is the power off upshift; detecting a contact duration until a speed of an input shaft of the transmission is lowered by a predetermined speed by applying a target pressure stored in a memory to the brake of the countershaft when the release of the clutch is completed; comparing the contact duration with a predetermined duration; correcting, when the contact duration is greater than the predetermined duration, the target pressure according to a difference between the contact duration and the predetermined duration; and storing and updating the corrected target pressure in the memory to apply a subsequent power on upshift.

20 Claims, 7 Drawing Sheets

METHOD AND SYSTEM OF LEARNING PRESSURE APPLIED TO COUNTERSHAFT BRAKE

CROSS-REFERENCE TO RELATED APPLICATION

The present application claims priority to Korean Patent Application No. 10-2020-0015909 filed on Feb. 10, 2020, the entire contents of which is incorporated herein for all purposes by this reference.

BACKGROUND OF THE INVENTION

Field of the Invention

The present invention relates to a method and a system of learning a pressure applied to a brake of a countershaft. The present invention relates to a method and a system of learning a pressure applied to a brake of a countershaft which prevent occurrence of flare and shift delay in a power on shift by learning the pressure applied to the brake of the countershaft in a power off shift.

Description of Related Art

Large commercial vehicles, such as buses and trucks, are provided with an automated manual transmission (AMT) which is configured for achieving eight or more speed stages.

An AMT in one form includes a power source, an input shaft selectively connectable to the power source via a clutch, at least one drive gear rotatably mounted on the input shaft, at least one first synchronizer selectively connecting the at least one drive gear to the input shaft, a countershaft mounted in parallel with the input shaft, at least one driven gear engaged with the at least one drive gear and fixedly mounted on the countershaft, at least one input gear fixedly mounted on the countershaft, a driveshaft mounted in parallel with the countershaft, at least one speed gear rotatably mounted on the driveshaft and engaged with the at least one input gear, at least one second synchronizer selectively connecting the at least one speed gear to the driveshaft, and an output shaft operably connected to the driveshaft. A speed of the power source is input to the input shaft by operation of the clutch, a speed of the input shaft is transmitted to the countershaft through the drive gear and the driven gear engaged with each other by operation of the first synchronizer, a speed of the countershaft is transmitted to the driveshaft through the input gear and the speed gear engaged with each other by operation of the second synchronizer, and a speed of the driveshaft is finally transmitted to the output shaft.

When a shift is performed by the AMT, the speed of the input shaft and the speed of the countershaft are synchronized with each other by the first synchronizer, and the speed of the countershaft and the speed of the driveshaft are synchronized with each other by the second synchronizer.

To help synchronization process by the first and second synchronizers, the AMT may further include a brake which reduces the speed of the countershaft or stops the countershaft. The brake in one form may include a friction member mounted at a fixed member and a piston mounted at a rotatable member. If a pressure is applied to the brake, the piston moves toward the friction member. If the piston contacts with the friction member, a speed of the rotatable member is reduced or the rotatable member is stopped by frictional force.

If the friction member of the brake wears, the piston may move further toward the friction member for operating the brake. To this end, the pressure applied to the brake may be changed according to a wear amount of the friction member. If the pressure applied to the brake is not changed according to the wear amount of the friction member, the shift may be delayed or flare may occur.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and a system of learning a pressure applied to a brake of a countershaft having advantages of preventing occurrence of flare and shift delay by learning the pressure applied to the brake of the countershaft in a power off shift and performing a power on shift using the learned pressure.

In one form of the present invention, a method of learning a pressure applied to a brake mounted on a countershaft of a transmission. The method may include determining, when a shift condition is satisfied, whether a shifting to be performed is a power off upshift; releasing a clutch mounted between a power source and the transmission when the shifting to be performed is the power off upshift; detecting a contact duration until a speed of an input shaft of the transmission is lowered by a predetermined speed by applying a target pressure stored in a memory to the brake of the countershaft when the release of the clutch is completed; comparing the contact duration with a predetermined duration; correcting, when the contact duration is greater than the predetermined duration, the target pressure according to a difference between the contact duration and the predetermined duration; and storing and updating the corrected target pressure in the memory to apply a subsequent power on upshift.

The comparing the contact duration with a predetermined duration may include prohibiting the correction of the target pressure when the contact duration is less than or equal to the predetermined duration.

Determining whether a shifting to be performed is a power off upshift may include prohibiting the correction of the target pressure when the shifting to be performed is the power on upshift.

The method may further include operating the brake of the countershaft until a contact point by applying the target pressure stored in the memory to the brake of the countershaft when the shifting to be performed is the power on upshift; and lowering the speed of the input shaft with a predetermined slope by controlling a hydraulic pressure applied to the brake of the countershaft in reaching the contact point.

The storing and updating the corrected target pressure in the memory may be performed when the corrected target pressure is equal to or less than a maximum allowance pressure.

The method may further include storing a failure code for the brake of the countershaft when the corrected target pressure is higher than the maximum allowance pressure.

The applying a target pressure stored in a memory to the brake of the countershaft may include applying a maximum pressure to the brake of the counter shaft; lowering the pressure applied to the brake of the countershaft to the target pressure; and maintaining the pressure applied to the brake of the countershaft as the target pressure.

The method may further include discharging the pressure applied to the brake of the countershaft after the speed of the input shaft is lowered by the predetermined speed.

In another form of the present invention, a system may include a transmission including an input shaft selectively connectable to a power source via a clutch, a countershaft mounted in parallel with the input shaft, a driveshaft mounted in parallel with the countershaft, an output shaft operably connected to the driveshaft, and a brake mounted on the countershaft and configured to lower a speed of the countershaft or stop the countershaft; and a controller configured to control operation of the clutch and the brake, change a speed of the power source through the input shaft, the countershaft, and the driveshaft operably connected to each other, and output the changed speed through the output shaft.

The controller, in power off upshift, may be configured to release the clutch, detect a contact duration until a speed of the input shaft is lowered by a predetermined speed by applying a target pressure stored in a memory of the controller to the brake when the release of the clutch is completed, correct the target pressure according to a difference between the contact duration and a predetermined duration when the contact duration is greater than the predetermined duration, and store and update the corrected target pressure in the memory.

The controller may be configured to prohibit the correction of the target pressure when the contact duration is less than or equal to the predetermined duration.

The controller may be configured to prohibit the correction of the target pressure in a power on upshift.

The controller, in the power on upshift, may be configured to operate the brake until a contact point by applying the target pressure stored in the memory to the brake, and lower the speed of the input shaft with a predetermined slope by controlling a hydraulic pressure to the brake in reaching the contact point.

The controller may be configured to store and update the corrected target pressure in the memory only when the corrected target pressure is equal to or less than a maximum allowance pressure.

The controller may be configured to store a failure code for the brake when the corrected target pressure is higher than the maximum allowance pressure.

In other form of the present invention, a system may include an input shaft selectively connectable to a power source via a clutch; at least one drive gear mounted on the input shaft; a countershaft mounted in parallel with the input shaft; at least one driven gear, each engaging with each of the at least one drive gear and mounted on the countershaft; at least one input gear mounted on the countershaft; a brake mounted on the countershaft and lowering a speed of the countershaft or stopping the countershaft by receiving a pressure; a driveshaft mounted in parallel with the countershaft; at least one speed gear, each mounted on the driveshaft and engaging each of the at least one input gear; at least two synchronizers; an output shaft operably connected to the driveshaft; and a controller configured for controlling operation of the clutch, the brake, and the at least two synchronizers.

One of the at least one drive gear and the at least one driven gear may be rotatably mounted on the input shaft or the countershaft and be operably connected to the input shaft or the countershaft by one of the at least two synchronizers, and the other of the at least one drive gear and the at least one driven gear may be fixedly mounted on the countershaft or the input shaft.

The one of the at least one input gear and the at least one speed gear may be rotatably mounted on the countershaft or the driveshaft and be operably connected to the countershaft or the driveshaft through the other of the at least two synchronizers, and the other of the at least one input gear and the at least one speed gear may be fixedly mounted on the driveshaft or the countershaft.

The controller, in power off upshift, may be configured to release the clutch, detect a contact duration until a speed of the input shaft is lowered by a predetermined speed by applying a target pressure stored in a memory of the controller to the brake when the release of the clutch is completed, correct the target pressure according to a difference between the contact duration and a predetermined duration when the contact duration is greater than the predetermined duration, and store and update the corrected target pressure in the memory.

The controller may be configured to prohibit the correction of the target pressure when the contact duration is less than or equal to the predetermined duration.

The controller may be configured to prohibit the correction of the target pressure in a power on upshift.

The controller, in the power on upshift, may be configured to operate the brake until a contact point by applying the target pressure stored in the memory to the brake, and lower the speed of the input shaft with a predetermined slope by controlling a hydraulic pressure to the brake in reaching the contact point.

The controller may be configured to store and update the corrected target pressure in the memory only when the corrected target pressure is equal to or less than a maximum allowance pressure.

The controller may be configured to store a failure code for the brake when the corrected target pressure is higher than the maximum allowance pressure.

According to exemplary embodiments of the present invention, a wear amount of a friction member of a brake mounted at a countershaft is indirectly detected and the wear amount is reflected on the pressure applied to the brake of the countershaft such that shift delay and occurrence of flare may be prevented.

Furthermore, since a driver may be notified of failure of the brake, accidents may be prevented from happening.

Furthermore, other effects of the exemplary embodiments of the present invention may be explicitly or implicitly described in the description provided herein. Various effects predicted according to the exemplary embodiments of the present invention will be included in the description provided herein.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the above-referenced drawings are not necessarily to scale, presenting a somewhat simplified representation of various exemplary features illustrative of the basic principles of the present invention. The specific design features of the present invention, including, for example, specific dimensions, orientations, locations, and shapes, will be determined in portion by the particular intended application and use environment.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The terminology used herein is for describing various exemplary embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in the exemplary embodiment, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "car," or other similar term as used herein is inclusive of motor vehicles, in general, such as passenger vehicles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as portion of its locomotion capabilities, electric power derived from a chargeable energy storage device (e.g., one or more rechargeable electrochemical cells or other type of battery). An EV is not limited to a vehicle and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Additionally, it is understood that one or more of the below methods, or aspects thereof, may be executed by at least one control unit (e.g., an engine control unit (ECU), a transmission control unit (TCU), etc.) or a controller. The term "control unit" or "controller" may refer to a hardware device that includes a memory and a processor. The memory is configured to store program instructions, and the processor is programmed to execute the program instructions to perform one or more processes which are described further below. The control unit or the controller may be configured to control operation of units, modules, parts, devices, or the like, as described herein. Moreover, it is understood that the below methods may be executed by an apparatus including the control unit or the controller in conjunction with one or more other components, as would be appreciated by a person of ordinary skill in the art.

Furthermore, the control unit of the present invention may be embodied as non-transitory computer readable media including executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Figure 1:
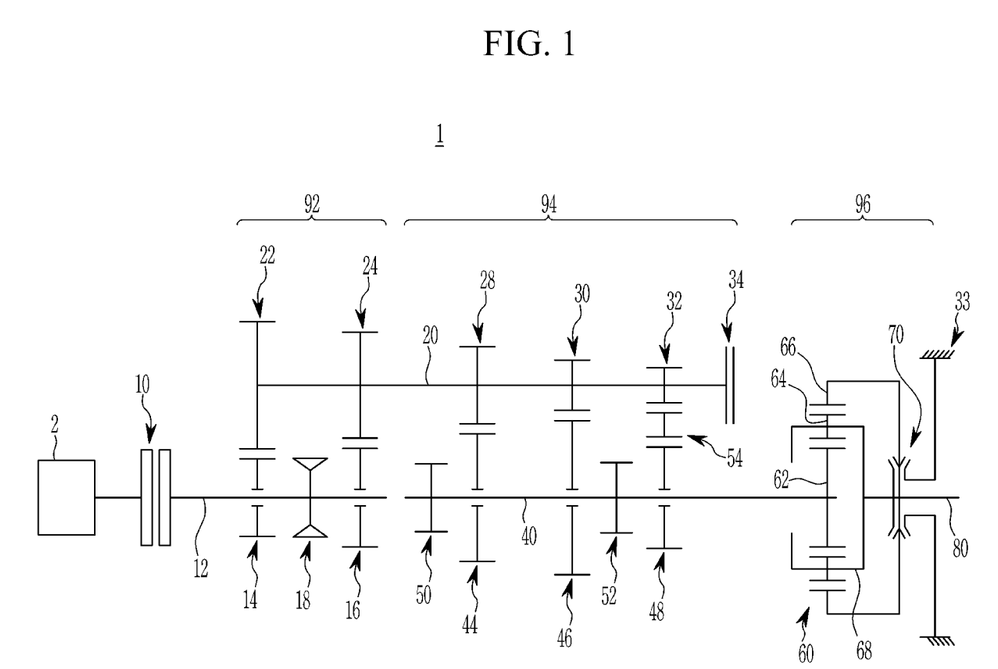
FIG. 1 is a schematic diagram of a transmission to which a method of learning a pressure applied to a brake of a countershaft according to an exemplary embodiment of the present invention.

FIG. 1 is a schematic diagram of a transmission to which a method of learning a pressure applied to a brake of a countershaft according to an exemplary embodiment of the present invention.

As shown in FIG. 1, a transmission 1 is selectively connectable to a power source 2 via a clutch 10. The transmission 1 receives power from the power source 2, changes a rotation speed of the power according to a target gear ratio, and outputs the power with the rotation speed being changed to an output shaft 80.

The power source 2 may be an engine, an electric motor, or the like. The engine burns a mixture of a fuel and an air to convert chemical energy into mechanical energy. The electric motor receives electrical energy form a battery and generates power. A type of the power source 2 is not limited to the engine or the motor. Hereinafter, it is exemplified that the engine is used as the power source 2.

The clutch 10 is mounted between the power source 2 and the transmission 1. If the clutch 10 is engaged the power of the power source 2 is transmitted to the transmission 1, and if the clutch 10 is released the power of the power source 2 is not transmitted to the transmission 1. The clutch 10 is released in a shift such that the power of the power source 2 is not transmitted to the transmission 1.

The transmission 1 includes an input shaft 12, a countershaft 20, and a driveshaft 40, and generates a desired gear ratio using gears mounted on the input shaft 12, the countershaft 20, and the driveshaft 40.

The input shaft 12 is selectively connectable to the power source 2 through the clutch 10. First and second drive gears 14 and 16 are rotatably mounted on the input shaft 12, and a first synchronizer 18 is mounted on the input shaft 12 between the first and the second drive gears 14 and 16. The first synchronizer 18 operably connects the first drive gear 14 or the second drive gear 16 to the input shaft 12. That is, if the first synchronizer 18 operably connects the first drive gear 14 to the input shaft 12, power of the input shaft 12 is transmitted to the first drive gear 14. On the other hand, if the first synchronizer 18 operably connects the second drive gear 14 to the input shaft 12, the power of the input shaft 12 is transmitted to the second drive gear 16.

The countershaft 20 is mounted in parallel with the input shaft 12. First and second driven gears 22 and 24 and first, second, and third input gears 28, 30, and 32 are fixedly mounted on the countershaft 20. The first and the second driven gears 22 and 24 and the first, the second, and the third input gears 28, 30, and 32 are mounted in a sequence of the first and the second driven gear 22 and 24 and the first, the second, and the third input gears 28, 30, and 32 from the power source 2. The first driven gear 22 is engaged with the first drive gear 14, and the second driven gear 24 is engaged with the second drive gear 16. Furthermore, a brake 34 is mounted on the countershaft 20. The brake 34 includes a piston operably connected to the countershaft 20 and a friction member fixed to the transmission housing 33, and reduces a speed of the countershaft 20 or stops the countershaft 20 by receiving a pressure from a pressure source and moving the piston toward the friction member. The brake 34 is not limited to the brake having a structure as described above, and any type of a brake which is configured for reducing the speed of the countershaft 20 or stopping the countershaft 20 may be used.

The driveshaft 40 is mounted in parallel with the countershaft 20. In some forms, the driveshaft 40 may be mounted on the same axis as the input shaft 10, but is not limited thereto. The first, the second, and the third speed gears 44, 46, and 48 are rotatably mounted on the driveshaft 40. The first, the second, and the third speed gears 44, 46, and 48 are mounted in a sequence of the first, the second, and the third speed gear 44, 46, and 48 from the power source 2. The first speed gear 44 is engaged with the first input gear 28, the second speed gear 46 is engaged with the second input gear 30, and the third speed gear 48 is operably connected to the third input gear 32 through an idle gear 54. A second synchronizer 50 is mounted on a driveshaft 40 between the second drive gear 16 and the first speed gear 44, and a third synchronizer 52 is mounted on the driveshaft 40 between the second and the third speed gears 46 and 48. The second synchronizer 50 operably connects the second drive gear 16 or the first speed gear 44 to the driveshaft 40, and the third synchronizer 52 operably connects the second speed gear 46 or the third speed gear 48 to the driveshaft 40. That is, if the second synchronizer 50 operably connects the second drive gear 16 to the driveshaft 40 power of the countershaft 20 is input to the driveshaft 40 through the second driven gear 24 and the second drive gear 16, and if the second synchronizer 50 operably connects the first speed gear 44 to the driveshaft 40 the power of the countershaft 20 is input to the driveshaft 40 through the first input gear 28 and the first speed gear 44. Here, the second driven gear 24 and the second drive gear 16 are also operated as an input gear and a speed gear for achieving one speed stage. Furthermore, if the third synchronizer 52 operably connects the second speed gear 46 to the driveshaft 40 the power of the countershaft 20 is input to the driveshaft 40 through the second input gear 30 and the second speed gear 46, and if the third synchronizer 52 operably connects the third speed gear 48 to the driveshaft 40 the power of the countershaft 20 is input to the driveshaft 40 through the third input gear 32, the idle gear 54, and the third speed gear 48.

A planetary gear set 60 is mounted on a rear portion of the driveshaft 40. The planetary gear set 60 includes a sun gear 62, a planet carrier 68, and a ring gear 66 as operating members, and changes a speed of the driveshaft 40 into two speeds to output to the output shaft 80. The sun gear 62 is directly connected to the driveshaft 40 to continuously receive the power of the driveshaft 40. The planet carrier 68 rotatably supports at least one pinion gear 64 and is directly connected to the output shaft 80. The at least one pinion gear 64 is engaged with the sun gear 62 and the ring gear 66 between the sun gear 62 and the ring gear 66. The ring gear 66 is engaged with the at least one pinion gear 64. A fourth synchronizer 70 is mounted on the output shaft 80 and operably connects the ring gear 66 to the planet carrier 68 or the transmission housing 33. That is, if the fourth synchronizer 70 connects the ring gear 66 to the planet carrier 68, the same speed as the speed of the driveshaft 40 is output to the output shaft 80. On the other hand, if the fourth synchronizer 70 connects the ring gear 66 to the transmission housing 33, a speed slower than the speed of the driveshaft 40 is output to the output shaft 80.

The transmission 1 illustrated in FIG. 1 includes a splitter portion 92, a main gear portion 94, and a range portion 96.

The splitter portion 92 includes the first and the second drive gears 14 and 16 and the first and the second driven gears 92, and generates two gear ratios by operation of the first synchronizer 18.

The main gear portion 94 includes the second drive gear 16, the second driven gear 24, the first, the second, and the third input gears 28, 30, and 32, the first, the second, and the third speed gears 44, 46, and 48, and the idle gear 54, and generates four gear ratios (three forward gear ratios and one reverse gear ratio) by operation of the second and the third synchronizers 50 and 52.

The range portion 96 includes the planetary gear set 60 and generates two gear ratios by operation of the fourth synchronizer 70.

Therefore, the transmission 1 can generate sixteen gear ratios (twelve forward gear ratios and four reverse gear ratios).

Figure 2:
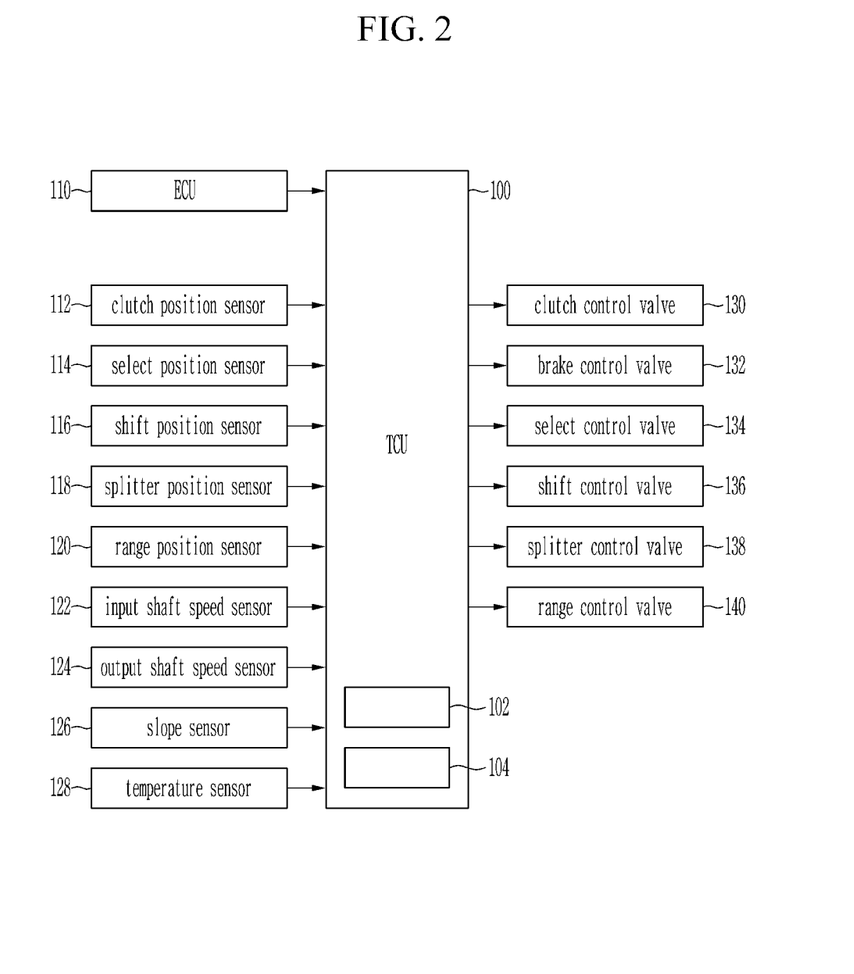
FIG. 2 is a block diagram of a system for controlling a transmission in FIG. 1.

FIG. 2 is a block diagram of a system for controlling a transmission in FIG. 1.

As shown in FIG. 2, a system for controlling the transmission 1 includes, but is not limited to, an engine control unit (ECU) 110, a clutch position sensor 112, a select position sensor 114, a shift position sensor 116, a splitter position sensor 118, a range position sensor 120, an input shaft speed sensor 122, an output shaft speed sensor 124, a slope sensor 126, a temperature sensor 128, a transmission control unit (TCU) 100, a clutch control valve 130, a brake control valve 132, a select control valve 134, a shift control valve 136, a splitter control valve 138, and a range control valve 140. The constituent elements included in the system are connected to each other through a controller area network (CAN).

The engine control unit 110 controls an operation of the engine and transmits an engine torque or an engine speed to the transmission control unit 100. If the motor is used as the power source 2, a motor control unit instead of the engine control unit 110 is used.

The clutch position sensor 112 detects a position of the clutch 10 (e.g., whether the clutch 10 is engaged or released), and transmits a signal corresponding thereto to the transmission control unit 100.

The select position sensor 114 and the shift position sensor 116 detect positions of the second and the third synchronizers 50 and 52 of the main gear portion 94, and transmit signals corresponding thereto to the transmission control unit 100.

The splitter position sensor 118 detects a position of the first synchronizer 18 and transmits a signal corresponding thereto to the transmission control unit 100.

The range position sensor 120 detects a position of the fourth synchronizer 70 and transmits a signal corresponding thereto to the transmission control unit 100.

The input shaft speed sensor 122 detects the speed of the input shaft 12 and transmits a signal corresponding thereto to the transmission control unit 100.

The output shaft speed sensor 124 detects a speed of the output shaft 80 and transmits a signal corresponding thereto to the transmission control unit 100.

The slope sensor 126 detects a slope of a road on which the vehicle is positioned and transmits a signal corresponding thereto to the transmission control unit 100.

The temperature sensor 128 detects a temperature of an oil and transmits a signal corresponding thereto to the transmission control unit 100.

The clutch control valve 130 controls a pressure supplied to the clutch 10 to control an operation of the clutch 10.

The brake control valve 132 controls a pressure supplied to the brake 34 to control an operation of the brake 34.

The select control valve 134 and the shift control valve 136 controls operations of the second and the third synchronizers 50 and 52.

The splitter control valve 138 controls an operation of the first synchronizer 18.

The range control valve 140 controls an operation of the fourth synchronizer 18.

The transmission control unit 100 receives data for the shift from the engine control unit 110 and the sensors 112 to 128, and controls the shift by controlling the control valves 130 to 140 based on the data. The transmission control unit 100 includes a memory 102 configured to store program instructions and a processor 104 configured to execute the program instructions to perform processes of a method according to an exemplary embodiment of the present invention. Hereinafter, the transmission control unit 100 will be called a controller.

Meanwhile, the system may further include various sensors and valves in addition to the constituent elements illustrated in FIG. 2.

Figure 3:
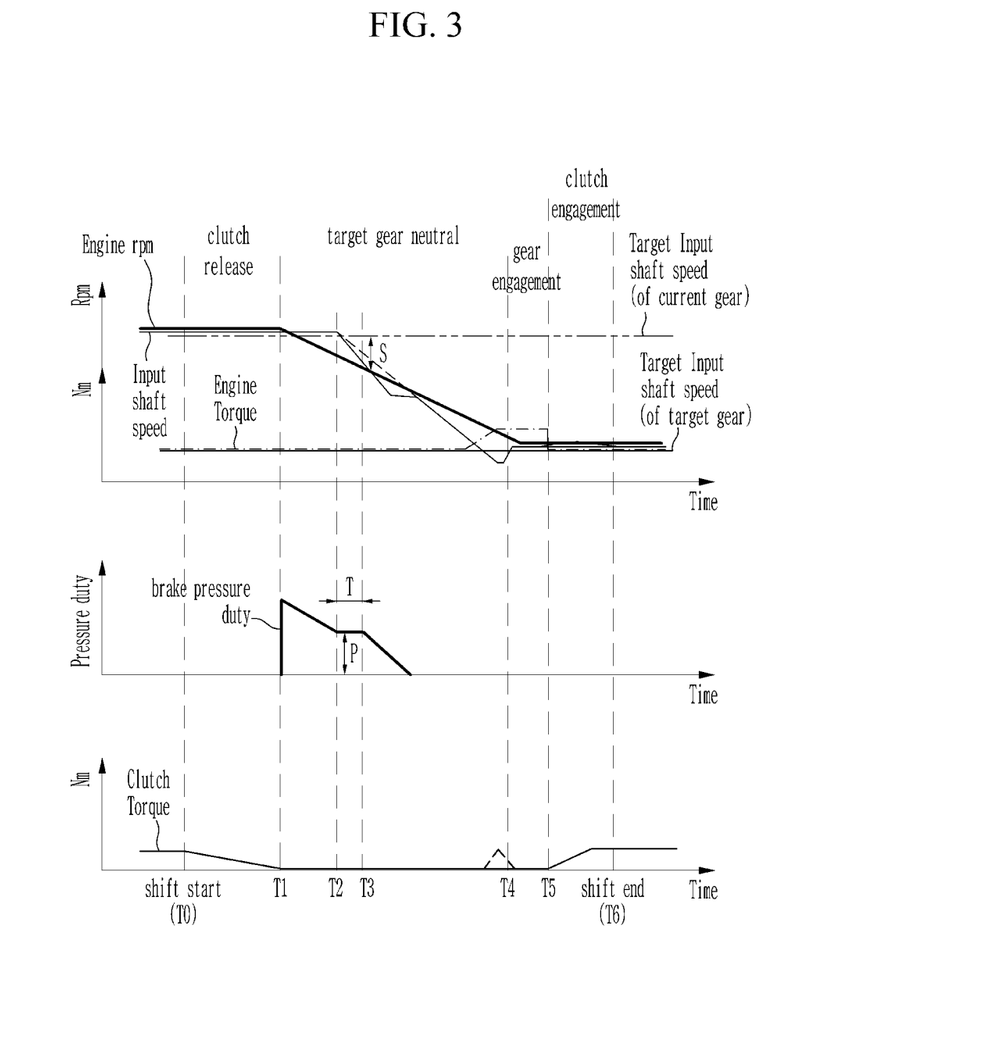
FIG. 3 is a graph illustrating an engine speed, a speed of an input shaft, an engine torque, a brake pressure duty, and a clutch torque over time in a power off shift.

FIG. 3 is a graph illustrating an engine speed, a speed of an input shaft, an engine torque, a brake pressure duty, and a clutch torque over time in a power off shift.

In upper graph of FIG. 3, a thick solid line represents the engine speed, a thin solid line represents the speed of the input shaft when a method according to the exemplary embodiment of the present invention is executed, and a dotted line represents the speed of the input shaft when a method according to a conventional art is executed.

As shown in FIG. 3, a clutch release step, a target gear neutral step, a gear engagement step, and a clutch engagement step are sequentially executed in a power off upshift.

In the exemplary embodiment, the power off upshift means an upshift when an accelerator pedal is released, and a power on upshift means an upshift when the accelerator pedal is pushed. In general, an upshift line is set according to a vehicle speed and a position of the accelerator pedal. The power off upshift occurs when the position of the accelerator pedal decreases sharply to cross the upshift line while the vehicle speed does not decreases or slightly decreases, and the power on upshift occurs when the vehicle speed increases to cross the upshift line while the position of the accelerator pedal does not increase or increases slightly.

The shift starts and the clutch 10 begins to be released at time T0. Therefore, the torque of the clutch 10 is reduced to 0. Furthermore, the engine speed and the speed of the input shaft 12 are maintained at a target engine speed and a target speed of the input shaft 12 at a current speed stage.

If the clutch 10 is completely released at time T1, the engine speed is reduced to a target engine speed at a target speed stage. Furthermore, the speed of the input shaft 12 is maintained at the target speed of the input shaft 12 at the current speed stage due to inertia until time T2, and then is reduced to a target speed of the input shaft 12 at the target speed stage.

Since a control of the input shaft 12 is not necessary in the power off upshift according to a conventional art, the brake 34 does not operate. Therefore, the speed of the input shaft 12 decreases along the dotted line.

However, in the power off upshift according to the exemplary embodiment of the present invention, the pressure of the brake 34 is increased to a maximum pressure at the time T1 and then is gradually reduced to a target pressure P to indirectly detect a wear amount of the friction member of the brake 34. Therefore, a line for supplying the pressure to the brake 34 is filled with fluid and the piston of the brake 34 contacts with the friction member. The target pressure P is preset through experiments.

After that, the controller 100 maintains the target pressure P applied to the brake 34 and detects a contact duration T until the speed of the input shaft 12 is lowered by a predetermined speed S. In FIG. 3, the speed of the input shaft 12 is lowered by the predetermined speed S at time T3. Furthermore, the speed of the input shaft 12 is reduced more rapidly as the target pressure P is applied to the brake 34.

After that, the controller 100 lowers the pressure applied to the brake 34 to release the brake 34. Therefore, the speed of the input shaft 12 is reduced to a target speed of the input shaft 12 at the target speed stage.

If the speed of the input shaft 12 reaches the target speed of the input shaft 12 at the target speed stage at time T4, the controller 100 engages the gears which achieve the target speed stage and starts to engage the clutch 10 at time T5. Therefore, the torque of the clutch 10 increases. After that, the shift ends at time T6.

Hereinafter, the principle of the method of learning the pressure applied to the brake according to the exemplary embodiment of the present invention will be described with reference to FIG. 4 and FIG. 5.

Figure 4:
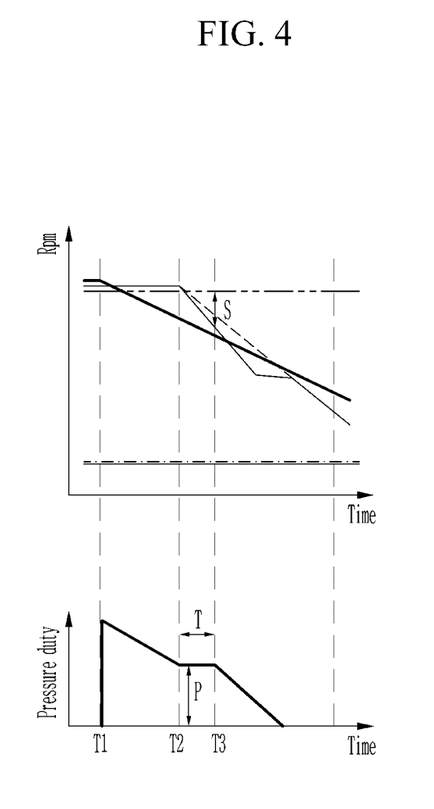
FIG. 4 is a graph illustrating an engine speed, a speed of an input shaft, and a brake pressure duty over time in a power off shift which is performed using a transmission provided with a brake of a countershaft without wear of a friction member.
Figure 5:
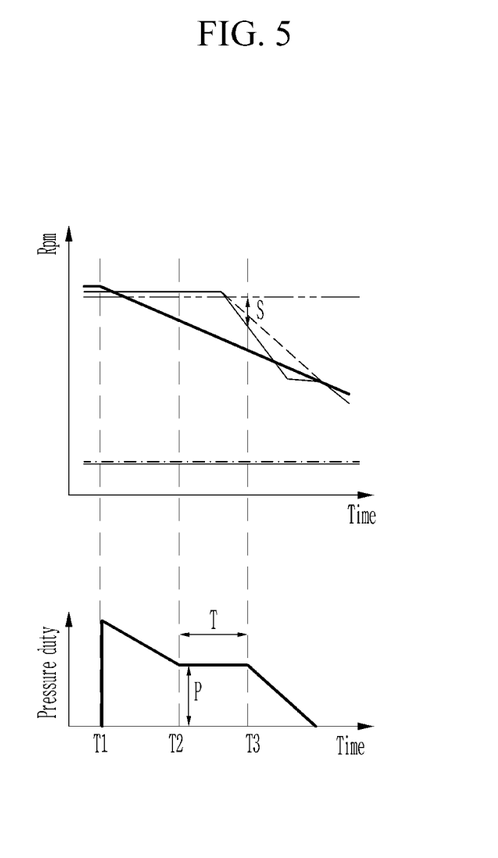
FIG. 5 is a graph illustrating an engine speed, a speed of an input shaft, and a brake pressure duty over time in a power off shift which is performed using a transmission provided with a brake of a countershaft with a friction member being worn.

FIG. 4 is a graph illustrating an engine speed, a speed of an input shaft, and a brake pressure duty over time in a power off shift which is performed using a transmission provided with a brake of a countershaft without wear of a friction member, and FIG. 5 is a graph illustrating an engine speed, a speed of an input shaft, and a brake pressure duty over time in a power off shift which is performed using a transmission provided with a brake of a countershaft with a friction member being worn.

As shown in FIG. 4, if the pressure applied to the brake 34 is increased to the maximum pressure at the time T1 and is then lowered to the target pressure P, the piston of the brake 34 contacts with the friction member. In further detail, if the target pressure P is applied to the brake 34 in which the friction member is not worn, the piston of the brake 34 contacts with the friction member. Here, a point in time when the piston contacts with the friction member (i.e., a point in time when the target pressure P is applied to the brake 34 and is maintained) will be called a contact point. In a case of the brake 34 in which the friction member is not worn, if the target pressure P applied to the brake 34 is maintained for a predetermined duration, the speed of the input shaft 12 is lowered by the predetermined speed S. That is, if the contact duration T until the speed of the input shaft 12 is lowered by the predetermined speed S is detected while the target pressure P applied to the brake 34 is maintained, the contact duration T is the same as the predetermined duration.

However, as shown in FIG. 5, if the target pressure P is applied to the brake 34 in which the friction member is worn, the piston of the brake 34 may not contact with the friction member. Therefore, a falling slope of the speed of the input shaft 12 when the friction member is worn is gentler than that of the speed of the input shaft 12 when the friction member is not worn. Therefore, if the contact duration T until the speed of the input shaft 12 is lowered by the predetermined speed S while maintaining the target pressure P applied to the brake 34 is detected, the contact duration T becomes greater than the predetermined duration. Therefore, the wear amount of the friction member may be indirectly detected by comparing the contact duration T with the predetermined duration, and the target pressure P may be corrected according to the wear amount of the friction member which is indirectly detected.

Figure 6:
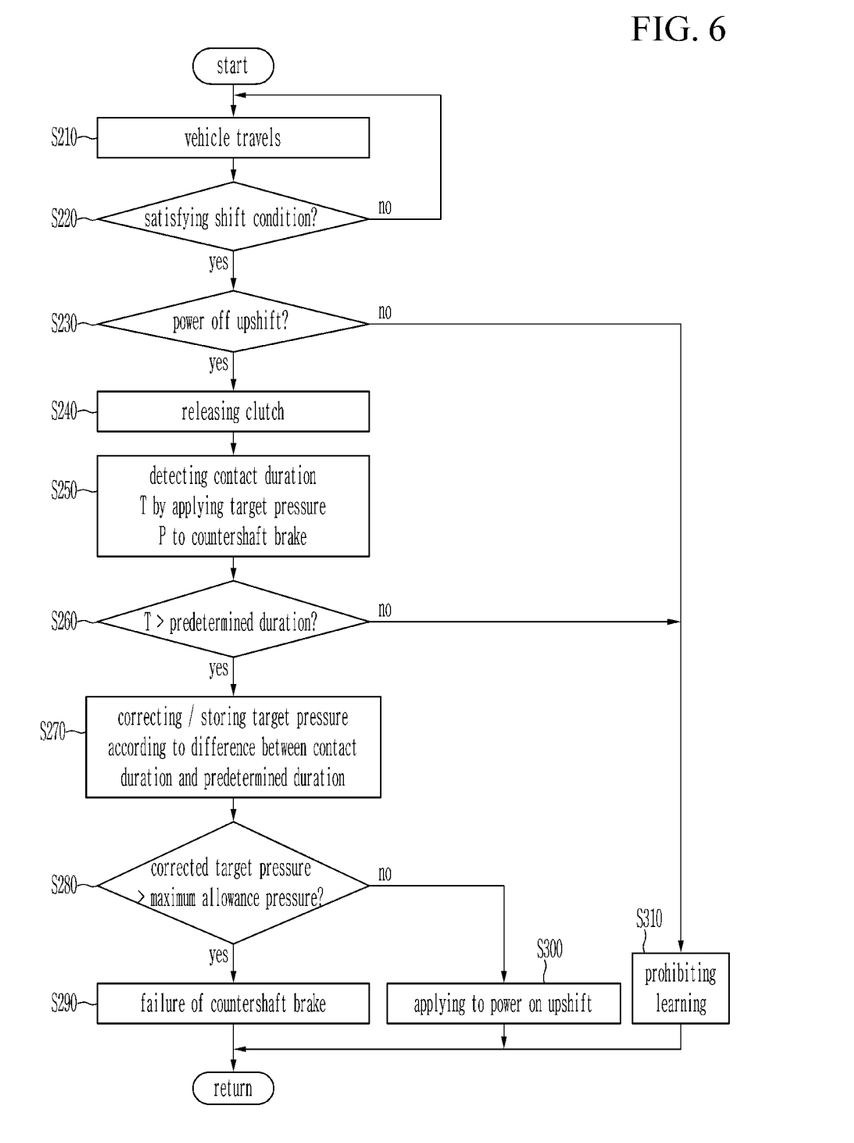
FIG. 6 is a flowchart of a method of learning a pressure applied to a brake of a countershaft according to an exemplary embodiment of the present invention.

FIG. 6 is a flowchart of a method of learning a pressure applied to a brake of a countershaft according to an exemplary embodiment of the present invention.

As shown in FIG. 6, the method according to the exemplary embodiment of the present invention begins when the vehicle travels at step S210. While the vehicle is controlled to travel, the controller 100 determines whether a current driving state satisfies a shift condition at step S220. The shift condition may be satisfied when the current driving state crosses a predetermined shift line according to the position of the accelerator pedal and the vehicle speed.

If the current driving state does not satisfy the shift condition at the step S220, the vehicle continues to travel at the current speed stage. If the current driving state satisfies the shift condition at the step S220, the controller 100 determines whether a shifting to be performed is the power off upshift at step S230. As described above, the power off upshift is executed when the upshift condition is satisfied by releasing the accelerator pedal.

If the shifting to be performed is not the power off upshift at the step S230, the controller 100 proceeds to step S310 in which learning of the pressure applied to the brake 34 is prohibited. If the shifting to be performed is the power off upshift at the step S230, the controller 100 releases the clutch 10. Accordingly, the pressure applied to the clutch 10 is discharged and the torque of the clutch 10 is reduced.

If the clutch 10 is released, the controller 100 applies the target pressure P to the brake 34 in a way as illustrated in FIG. 3, FIG. 4 and to FIG. 5 and detects the contact duration T until the speed of the input shaft 10 is lowered by the predetermined speed S at step S250. The target pressure P may be pre-stored in the memory 102.

After that, the controller 100 compares the contact duration T with the predetermined duration at step S260. That is, the controller 100 determines whether the contact duration T is greater than the predetermined duration.

If the contact duration T is less than or equal to the predetermined duration at the step S260, the controller 100 proceeds to the step S310 in which the learning of the pressure applied to the brake 34 is prohibited. If the contact duration T is greater than the predetermined duration at the step S260, the controller 100 determines that the friction member of the brake 34 is worn and corrects the target pressure P at step S270. That is, the controller 100 indirectly detects the wear amount of the friction member by determining a difference between the contact duration T and the predetermined duration, corrects the target pressure P according to the difference between the contact duration T and the predetermined duration, and stores the corrected target pressure P in the memory 102. A pressure correction according to the difference between the contact duration T and the predetermined duration ($\Delta T = T$ - predetermined duration) is exemplified in Table 1.

TABLE 1

| $\Delta T$ | 50 ms | 100 ms | 200 ms | 500 ms |
|---|---|---|---|---|
| pressure correction | 0 | 0.5 bar | 1 bar | 3 bar |

The corrected target pressure P is sum of the target pressure P before correction and the pressure correction. For example, if $\Delta T$ is less than 50 ms, the corrected target pressure is the same as the target pressure P before correction. If $\Delta T$ is between 50 ms and 100 ms, the corrected target pressure is sum of the target pressure P before correction and 0.5 bar. If the corrected target pressure is determined, the controller 100 updates the target pressure P by storing the corrected target pressure in the memory 102.

After that, the controller 100 compares the corrected target pressure with a maximum allowance pressure at step S280. That is, the controller 100 determines whether the corrected target pressure is higher than a maximum allowance pressure.

If the corrected target pressure is higher than the maximum allowance pressure at the step S280, the controller 100 determines that the brake 34 is damaged and sends a warning signal to a driver at step S290. The warning signal may be visual, audio, or tactile. In one form, the warning signal may be sent in a form of a message to a mobile device registered by a user. The warning signal informs the driver of a replacement time to replace the brake 34 so that accidents may be prevented from happening.

If the corrected target pressure is equal to or less than the maximum allowance pressure at the step S280, the controller 100 can cause the corrected target pressure stored in the memory 102 to be applied to a subsequent power on upshift at step S300.

Figure 7:
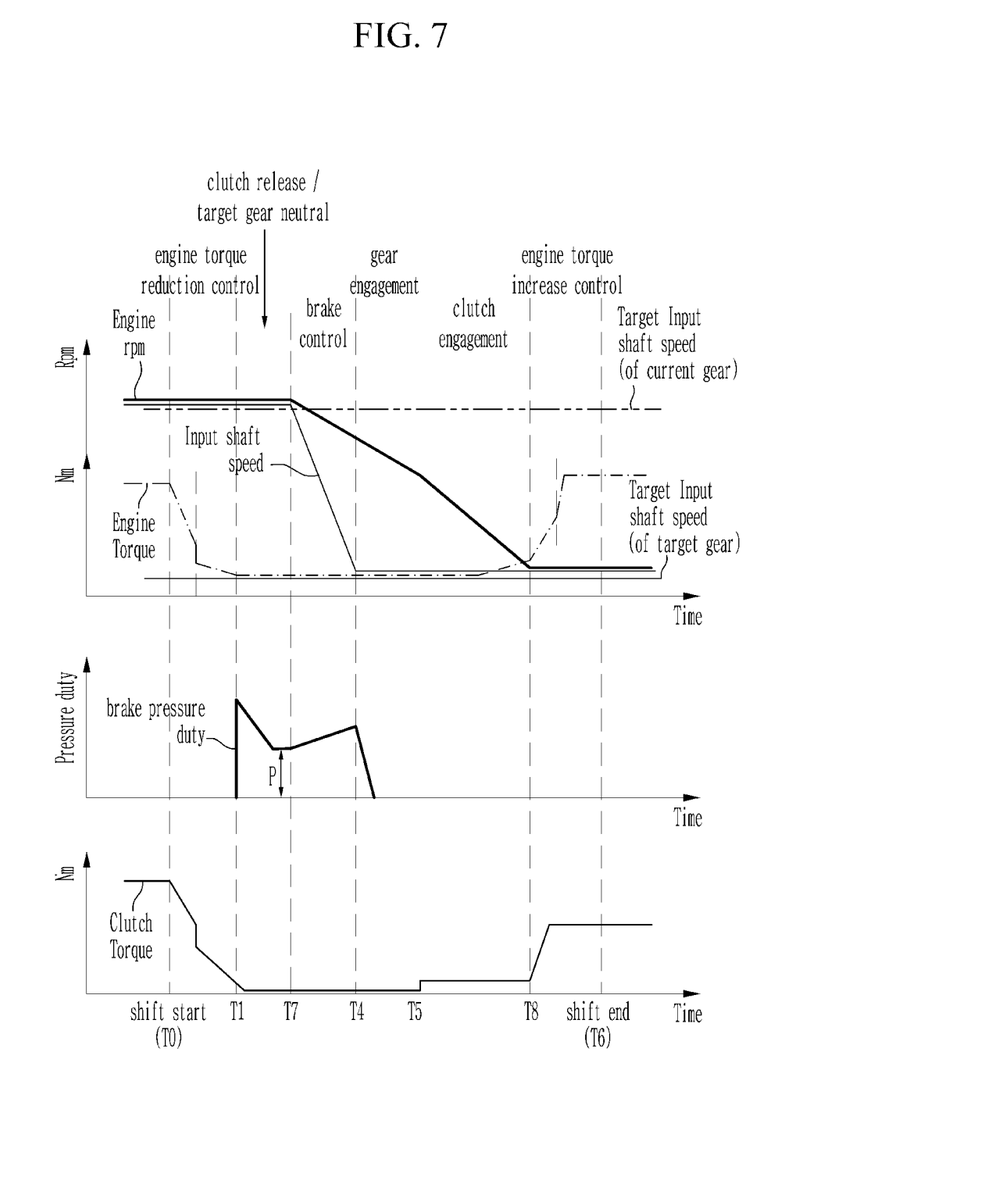
FIG. 7 is a graph illustrating an engine speed, a speed of an input shaft, an engine torque, a brake pressure duty, and clutch torque over time in a power on shift.

FIG. 7 is a graph illustrating an engine speed, a speed of an input shaft, an engine torque, a brake pressure duty, and clutch torque over time in a power on shift.

In an upper graph of FIG. 7, a thick solid line represents the engine speed and a thin solid line represents the speed of the input shaft.

As shown in FIG. 7, an engine torque reduction control step, a clutch release and target gear neutral step, a brake control step, a gear engagement step, a clutch engagement step, and an engine torque increase control step are sequentially executed in the power on upshift. As described above, the power on upshift is the upshift occurring by pushing the accelerator pedal. Therefore, the engine torque is reduced to synchronize the target gears, the target gears are engaged, and the engine torque is increased to a target engine torque when the target gears are engaged completely in the power on upshift.

If the shift starts at the time T0, the engine torque begins to be reduced.

Simultaneously, the torque of the clutch 10 becomes reduced and the clutch 10 begins to be released. Furthermore, the engine speed and the speed of the input shaft 12 are maintained at the target engine speed and the target speed of the input shaft 12 at the current speed stage.

If the engine torque reduction control is completed at the time T1, the torque of the clutch 10 is reduced to 0 to complete the release of the clutch 10. Furthermore, the pressure of the brake 34 is increased to the maximum pressure at the time T1 and then is gradually reduced to the target pressure P. Here, the target pressure P may be the target pressure P which is corrected and stored in the memory 102, or the predetermined target pressure P if the target pressure is not corrected. That is, the target pressure P on which the wear amount of the friction member detected in the power off upshift is reflected is used in the power on upshift.

After that, if the target pressure P is maintained, the piston of the brake 34 reaches the contact point where the piston of the brake 34 contacts with the friction member of the brake 34 at time T7. Accordingly, the engine speed and the speed of the input shaft 12 begin to be reduced. Since the clutch 10 is released and the brake 34 is operated, a falling slope of the engine speed is gentle and the falling slope of the speed of the input shaft 12 is steep.

After reaching the contact point T7, the controller 100 controls the pressure applied to the brake 34. In one form, the pressure applied to the brake 34 may be increased with a predetermined slope. The speed of the input shaft 12 is lowered with the predetermined slope by controlling the pressure applied to the brake 34, and the speed of the input shaft 12 reaches the target speed of the input shaft 12 at the target speed stage at the time T4.

If the speed of the input shaft 12 reaches the target speed of the input shaft 12 at the target speed stage, the controller 100 discharges the pressure applied to the brake 34. Furthermore, the controller 100 begins to engage the gears achieving the target speed stage.

If the gears achieving the target speed stage are completely engaged at the time T5, the controller 100 begins to engage the released clutch 10. That is, the pressure is applied to the clutch 10 and thereby increasing the torque of the clutch 10. At the instant time, the engine speed is reduced to the target engine speed at the target speed stage. Furthermore, the engine torque begins to be gradually increased.

If the engine speed reaches the target engine speed at the target speed stage at time T8, the engine torque is increased along a predetermined pattern. Furthermore, the torque of the clutch 10 is also increased to a target torque of the clutch 10. After that, the shift ends at the time T6.

As described above, the wear amount of the friction member of the brake is indirectly detected by learning the pressure applied to the brake in the power off shift when the control of the brake is not necessary, and the power on shift is executed using the learned pressure such that occurrence of flare and shift delay may be prevented according to the exemplary embodiments of the present invention.

Furthermore, if the wear amount of the friction member is large, it is possible to prevent the accident in advance by informing the driver of the replacement time of the brake.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of learning a pressure applied to a brake which is mounted on a countershaft of a transmission, the method comprising:
   determining, by a controller, upon determining that a shift condition is satisfied, whether a shifting to be performed is a power off upshift;
   releasing, by the controller, a clutch mounted between a power source and the transmission when the shifting to be performed is the power off upshift;
   determining, by the controller, a contact duration until a speed of an input shaft of the transmission is lowered by a predetermined speed by applying a target pressure stored in a memory to the brake of the countershaft when the release of the clutch is completed;
   comparing, by the controller, the contact duration with a predetermined duration;
   correcting, by the controller, the target pressure according to a difference between the contact duration and the predetermined duration, when the contact duration is greater than the predetermined duration; and
   storing and updating, by the controller, the corrected target pressure in the memory to apply a subsequent power on upshift.

2. The method of claim 1, wherein the comparing the contact duration with a predetermined duration includes prohibiting the correction of the target pressure when the contact duration is less than or equal to the predetermined duration.

3. The method of claim 1, wherein determining when a shifting to be performed is a power off upshift includes prohibiting the correction of the target pressure upon determining that the shifting to be performed is the power on upshift.

4. The method of claim 3, further including:
operating the brake of the countershaft until a contact point by applying the target pressure stored in the memory to the brake of the countershaft when the shifting to be performed is the power on upshift; and
lowering the speed of the input shaft with a predetermined slope by controlling a hydraulic pressure applied to the brake of the countershaft in reaching the contact point.

5. The method of claim 1, wherein the storing and updating the corrected target pressure in the memory is performed when the corrected target pressure is equal to or less than a maximum allowance pressure.

6. The method of claim 5, further including storing a failure code for the brake of the countershaft when the corrected target pressure is higher than the maximum allowance pressure.

7. The method of claim 1, wherein the applying a target pressure stored in a memory to the brake of the countershaft includes:
applying a maximum pressure to the brake of the counter shaft;
lowering the pressure applied to the brake of the countershaft to the target pressure; and
maintaining the pressure applied to the brake of the countershaft as the target pressure.

8. The method of claim 7, further including discharging the pressure applied to the brake of the countershaft after the speed of the input shaft is lowered by the predetermined speed.

9. A system comprising:
a transmission including an input shaft selectively connectable to a power source via a clutch, a countershaft mounted in parallel with the input shaft, a driveshaft mounted in parallel with the countershaft, an output shaft operably connected to the driveshaft, and a brake mounted on the countershaft and configured to lower a speed of the countershaft or stop the countershaft; and
a controller configured to control operation of the clutch and the brake, change a speed of the power source through the input shaft, the countershaft, and the driveshaft operably connected to each other, and output the changed speed through the output shaft,
wherein the controller, in power off upshift, is configured to:
release the clutch,
detect a contact duration until a speed of the input shaft is lowered by a predetermined speed by applying a target pressure stored in a memory of the controller to the brake when the release of the clutch is completed,
correct the target pressure according to a difference between the contact duration and a predetermined duration when the contact duration is greater than the predetermined duration, and
store and update the corrected target pressure in the memory.

10. The system of claim 9, wherein the controller is configured to prohibit the correction of the target pressure when the contact duration is less than or equal to the predetermined duration.

11. The system of claim 9, wherein the controller is configured to prohibit the correction of the target pressure in a power on upshift.

12. The system of claim 11, wherein the controller, in the power on upshift, is configured to:
operate the brake until a contact point by applying the target pressure stored in the memory to the brake, and
lower the speed of the input shaft with a predetermined slope by controlling a hydraulic pressure to the brake in reaching the contact point.

13. The system of claim 9, wherein the controller is configured to store and update the corrected target pressure in the memory when the corrected target pressure is equal to or less than a maximum allowance pressure.

14. The system of claim 13, wherein the controller is configured to store a failure code for the brake when the corrected target pressure is higher than the maximum allowance pressure.

15. A system comprising:
an input shaft selectively connectable to a power source via a clutch;
at least a drive gear mounted on the input shaft;
a countershaft mounted in parallel with the input shaft;
at least a driven gear, each engaging with each of the at least a drive gear and mounted on the countershaft;
at least an input gear mounted on the countershaft;
a brake mounted on the countershaft and lowering a speed of the countershaft or stopping the countershaft by receiving a pressure;
a driveshaft mounted in parallel with the countershaft;
at least a speed gear, each mounted on the driveshaft and engaging with each of the at least an input gear;
at least two synchronizers;
an output shaft operably connected to the driveshaft; and
a controller configured for controlling operation of the clutch, the brake, and the at least two synchronizers,
wherein one of the at least a drive gear and the at least a driven gear is rotatably mounted on the input shaft or the countershaft and is operably connected to the input shaft or the countershaft by one of the at least two synchronizers, and another of the at least a drive gear and the at least a driven gear is fixedly mounted on the countershaft or the input shaft,
wherein one of the at least an input gear and the at least a speed gear is rotatably mounted on the countershaft or the driveshaft and is operably connected to the countershaft or the driveshaft through another of the at least two synchronizers, and another of the at least an input gear and the at least a speed gear is fixedly mounted on the driveshaft or the countershaft, and
wherein the controller, in power off upshift, is configured to:
release the clutch,
detect a contact duration until a speed of the input shaft is lowered by a predetermined speed by applying a target pressure stored in a memory of the controller to the brake when the release of the clutch is completed,
correct the target pressure according to a difference between the contact duration and a predetermined duration when the contact duration is greater than the predetermined duration, and
store and update the corrected target pressure in the memory.

16. The system of claim 15, wherein the controller is configured to prohibit the correction of the target pressure when the contact duration is less than or equal to the predetermined duration.

17. The system of claim 15, wherein the controller is configured to prohibit the correction of the target pressure in a power on upshift.

18. The system of claim 17, wherein the controller, in the power on upshift, is configured to:
- operate the brake until a contact point by applying the target pressure stored in the memory to the brake, and
- lower the speed of the input shaft with a predetermined slope by controlling a hydraulic pressure to the brake in reaching the contact point.

19. The system of claim 15, wherein the controller is configured to store and update the corrected target pressure in the memory when the corrected target pressure is equal to or less than a maximum allowance pressure.

20. The system of claim 19, wherein the controller is configured to store a failure code for the brake when the corrected target pressure is higher than the maximum allowance pressure.

\* \* \* \* \*